(12) United States Patent
Petryshen

(10) Patent No.: US 8,413,795 B2
(45) Date of Patent: Apr. 9, 2013

(54) VARIABLE PHASE STEP FEEDER

(75) Inventor: Larry Petryshen, Salmon Arm (CA)

(73) Assignee: USNR/Kockums Cancar Company, Vancouver, WA (US)

( * ) Notice: Subject to any disclaimer, the term of this patent is extended or adjusted under 35 U.S.C. 154(b) by 165 days.

(21) Appl. No.: 13/036,571

(22) Filed: Feb. 28, 2011

(65) Prior Publication Data

US 2012/0217133 A1    Aug. 30, 2012

(51) Int. Cl.
*B65G 25/00*    (2006.01)
(52) U.S. Cl. ..................... 198/774.3; 198/777
(58) Field of Classification Search ............... 198/774.1, 198/775, 776, 774.3, 774.4, 777
See application file for complete search history.

(56) References Cited

U.S. PATENT DOCUMENTS

| | | | |
|---|---|---|---|
| 3,166,947 A | | 1/1965 | Hendershot |
| 3,592,330 A | * | 7/1971 | Smith ........................... 198/776 |
| 4,624,614 A | * | 11/1986 | Levad et al. ................ 198/774.3 |
| 4,865,180 A | * | 9/1989 | Brems et al. ............... 198/774.3 |
| 5,374,157 A | * | 12/1994 | Allard ........................ 198/774.3 |

FOREIGN PATENT DOCUMENTS

CA    2271931    12/1999

OTHER PUBLICATIONS http://www.kit-sell.fi/en/products/sawmill+machinery/sawmill+equipment/step+feeder—Kit-Sell Oy, Asematie 10, 82380 Tolosenmaki, Finland, product literature.
http://www.candycontrols.com/PhaseVariator/PhaseVariator.htm—Candy Mfg. Co., Inc., 5633 W. Howard Street, Niles, IL 60714, product literature.

* cited by examiner

*Primary Examiner* — James R Bidwell
(74) *Attorney, Agent, or Firm* — Schwabe, Williamson & Wyatt

(57) ABSTRACT

Embodiments of the present disclosure generally provide a variable phase step feeder including a fixed set of stairs and a moving set of stairs. The fixed set of stairs may include a first fixed step, a second fixed step, and a third fixed step. The moving set of stairs may be interposed between the fixed set of stairs, and include a first moving step adapted to transport a workpiece from the first fixed step to the second fixed step and a second moving step adapted to transport the workpiece from the second fixed step to the third fixed step. The variable phase step feeder may further include a control mechanism for adjusting a phase relationship of the first moving step relative to the second moving step.

25 Claims, 6 Drawing Sheets

VARIABLE PHASE STEP FEEDER

TECHNICAL FIELD

Embodiments herein relate to step feeders used in lumber processing.

BACKGROUND

Step feeders are often used to transfer lumber from a receiving location to a delivery location, and in the process to singulate (i.e., separate) the boards and properly align the boards for further processing. Many step feeders consist of a set of moving stairs and a set of fixed stairs, both slanted at an upward angle. The set of moving stairs and the set of fixed stairs often consist of multiple levels of stairs, each level including segments along the length of the stair so that the two sets of stairs interlock with each other. The moving stairs are driven up and down along the angle of the stairs by a motor and crank shaft or other arrangement. As the moving set of stairs is driven upward, it pushes a board up, and the board catches the fixed stair at the next level as the moving stair moves back downward. The board is pushed upward by the moving stair at the next level in the same manner, and eventually reaches the delivery location.

Other step feeders have one or two sets of moving stairs, but include two moving sets of stairs interposed with each other, one set moving up while the other set moves down. However, the steps within each set of stairs move together, e.g., the step at one level moves in phase with the step at another level. This causes uneven distribution of horsepower across the cycle of the stairs. Furthermore, this arrangement may not effectively singulate the boards as they travel up the step feeder.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
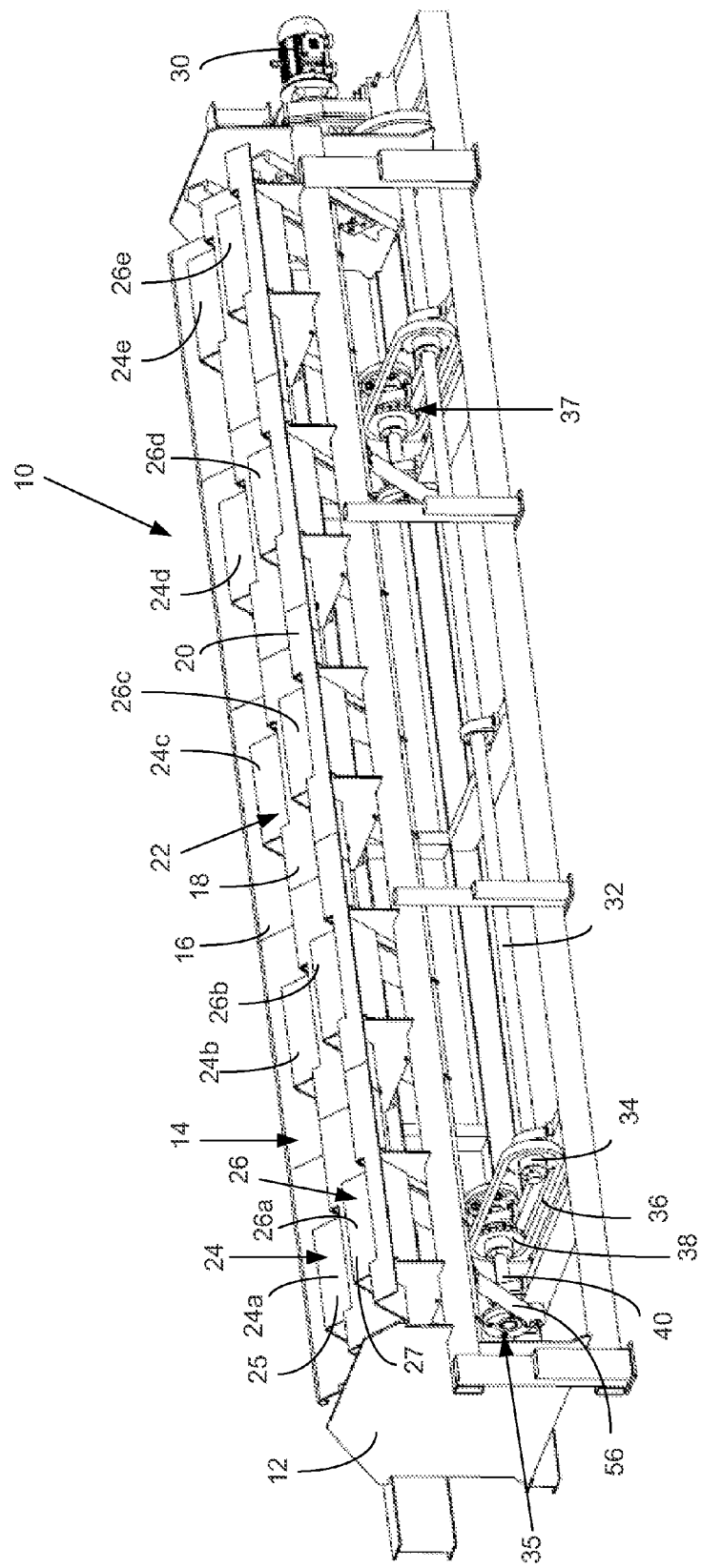
FIG. 1 is a frontal perspective view of a variable phase step feeder in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for a variable phase step feeder are provided.

Embodiments herein generally provide a variable phase step feeder including a moving set of stairs and a fixed (e.g., stationary) set of stairs. The moving set of stairs may include a plurality of steps, i.e., at least a first step and a second step, although any number of steps are possible. Similarly, the fixed set of stairs may include a plurality of fixed steps, i.e., a first step, a second step, and a third step. Each level of moving steps may be driven along a reciprocating path from one level of the fixed stairs to the next level of the fixed stairs. That is, the first moving step may be driven on a path generally from the level of the first fixed step to the level of the second fixed step. Similarly, the second moving step may be driven on a path generally from the level of the second fixed step to the level of the third fixed step. In various embodiments, the travel of a first step of the moving stairs may be out of phase with the travel of a second step of the moving stairs. That is, the first moving step may be driven such that it reaches the top of its path at a different time from which the second moving step reaches the top of its path. Having the steps move out of phase with each other may distribute the horsepower necessary to drive the steps over more of the drive cycle compared to steps that are driven in phase with one another, which may allow the use of a smaller motor. Furthermore, the out of phase movement of the steps may improve the singulation, e.g., separation of the workpieces, of the step feeder.

Additionally, various embodiments generally provide a mechanism for adjusting the phase relationship of the moving steps relative to each other. This adjustment mechanism allows the operator to set the phase relationship of the steps according to the conditions of use. For example, the operator may find that the step feeder singulates the workpieces best when the steps are driven with a certain phase difference relative to each other. This optimal phase difference may vary depending on the operating conditions, such as the dimensions of the workpieces, the quantity of workpieces handled by the step feeder, etc.

In some embodiments, each step level of the moving set of stairs may include a plurality of laterally spaced step segments. In these embodiments, the fixed stairs may be disposed between the segments of the moving stairs to facilitate the transfer from one step level of the moving stairs to the next step level of the fixed stairs. In various embodiments, the laterally spaced step segments may be connected in one piece or may be separate pieces. Each step level may include any suitable number of step segments.

In various embodiments, the steps of the fixed stairs and the moving stairs may be disposed at an angle from the vertical to prevent the workpieces from falling off the edge of the steps and encourage the movement of the workpieces in the direction of the delivery location. As the workpieces reach the next step in the step feeder, they may slide down to the lower edge of the step. This places the workpieces in position to be carried to the following step by the moving stairs. Additionally, the angle of the steps may help to properly align the workpieces for further processing at the delivery location. For example, in the case of lumber, the step feeder may orient the boards parallel to one another and with the wider face pointed down.

In various embodiments, a top surface of the first fixed step may define a first step plane, a top surface of the second fixed step may define a second step plane, and a top surface of the third fixed step may define a third step plane. In such embodiments, during the reciprocal path of the first moving step of the moving stairs, a top surface of the first moving step may travel from at or below the first step plane to at or above the second step plane. Similarly, during the reciprocal path of the second moving step of the moving stairs, the top surface of the second moving step may travel from at or below the second step plane to at or above the third step plane.

In various embodiments, one or more workpieces may be delivered to a first step level of fixed stairs. As the first moving step of the moving stairs is driven upwards, it may engage one or more of the workpieces. As the workpieces cross the plane of the second fixed step, the workpieces may begin to slide down the second fixed step. When the first moving step drops back below the plane of the second step, the workpieces may be passed off to the second fixed step and continue sliding toward the bottom of the step. The workpieces may then be engaged by the second moving step and any subsequent steps of the moving stairs, in a similar manner, until the workpieces reach the delivery location. At each step, the moving stairs may engage fewer of the workpieces, such that the workpieces become singulated, e.g., separated. In some embodiments, the step feeder may deliver only one workpiece to the delivery location with every cycle. However, in other embodiments the step feeder may deliver a plurality of workpieces to the delivery location with each cycle. In some embodiments, the workpieces may be further singulated by a downstream processing element, such as an unscrambler.

In various embodiments, the moving stairs may be driven by a drive assembly. In some embodiments, the drive assembly may include a drive motor coupled to one or more crankshafts. The drive motor may be any suitable motor, such as a servo-motor, variable speed motor, electric motor, hydraulic motor, pneumatic motor, etc. In some embodiments, the drive motor may drive both the first moving step and the second moving step of the moving stairs. In other embodiments, a first drive motor may drive the first moving step and a second drive motor may drive the second moving step. In some embodiments, the first drive motor and second drive motor may be operated independently. In some such embodiments, the first drive motor and second drive motor may drive the respective steps at different speeds, thereby creating a constantly changing phase relationship between the first moving step and the second moving step.

In some embodiments, the crankshaft may include a first cam coupling the crankshaft to a first crank arm for the first moving step, and a second cam coupling the crankshaft to a second crank arm for the second moving step. The first cam and second cam may each include a lobe with a mounting location where the crank arm may be coupled to the cam. In various embodiments, the crankshaft assembly may be configured such that the first cam may be rotated relative to the second cam about the axis of the crankshaft. By rotating the first cam relative to the second cam, the phase difference between the first moving step and the second moving step may be adjusted.

In some embodiments, the first cam and the second cam may be coupled to the crankshaft via a first member and a second member, respectively, on the crankshaft. In embodiments, at least one of the first member and the second member on the crankshaft may include a plurality of slots for mounting the cam to the crankshaft. The cam may be mounted to the crankshaft by bolts disposed through the slots. In these embodiments, the first cam may be coupled to the crankshaft with the lobe of the first cam at an angle relative to the lobe of the second cam to create the desired phase difference between the first step and second step of the moving stairs. In some embodiments the slots may be of differing lengths and/or be unevenly spaced, which may allow a wider range of possible angles between the first cam and the second cam.

In some embodiments, the first member and/or second member may be a ring. Additionally, in some embodiments, the slots of the member may be annular slots. The annular slots may facilitate relative rotation of the first cam relative to the second cam on the crankshaft.

In other embodiments, the first member and/or second member may include a plurality of mounting holes disposed substantially equidistant from a central mounting point of the member, e.g., in a substantially circular arrangement. In these embodiments, the plurality of mounting holes may allow the first cam to be positioned at various angles with respect to the second cam. The cam may be coupled to the member using some or all of the mounting holes.

In some embodiments, the variable phase step feeder may be configured to facilitate changing the phase during use and/or between uses. For example, in some embodiments, a phase variator may be used to control the phase of the first step relative to the second step of the moving stairs. The phase variator may be controlled by any suitable means, such as mechanically, pneumatically, and/or electronically. Additionally, the phase variator may include a control mechanism for adjusting the phase, such as a knob, dial, slider, buttons, etc. In some embodiments, the phase variator may be controlled remotely, either by a wired or wireless controller.

In some embodiments, the variable phase step feeder may include a plurality of crankshafts coupled to the moving stairs. The plurality of crankshafts may all be coupled to the same drive motor, or may be coupled to different drive motors. The plurality of crank shafts may each drive separate steps of the moving stairs, or they may drive the same step or group of steps of the moving stairs. In embodiments with multiple crankshafts, the phase of the crank arms of the different crankshafts may be adjusted by the same control mechanism or may be adjusted independently.

In various embodiments of the variable phase step feeder, the receiving location of the step feeder may be at any height relative to the delivery location of the step feeder (that is, where the step feeder discharges or delivers singulated workpieces). For example, in some embodiments, the receiving location and the delivery location may be at the same height relative to the ground. In other embodiments, the receiving location may be at a different height than the delivery location, such as higher or lower than the delivery location.

In various embodiments, the step feeder may include any suitable number of step levels, such as about two or more step levels. One or more of the moving step levels may have a different phase than at least one other moving step level. In some embodiments, one or more step levels may have the same phase as one or more other step levels. The phase of at least one of the step levels may be controllable relative to a reference step. In some embodiments, the phase of a group of steps may be linked such that changing the phase of one step within the group changes the phase of the group of steps.

Figure 2:
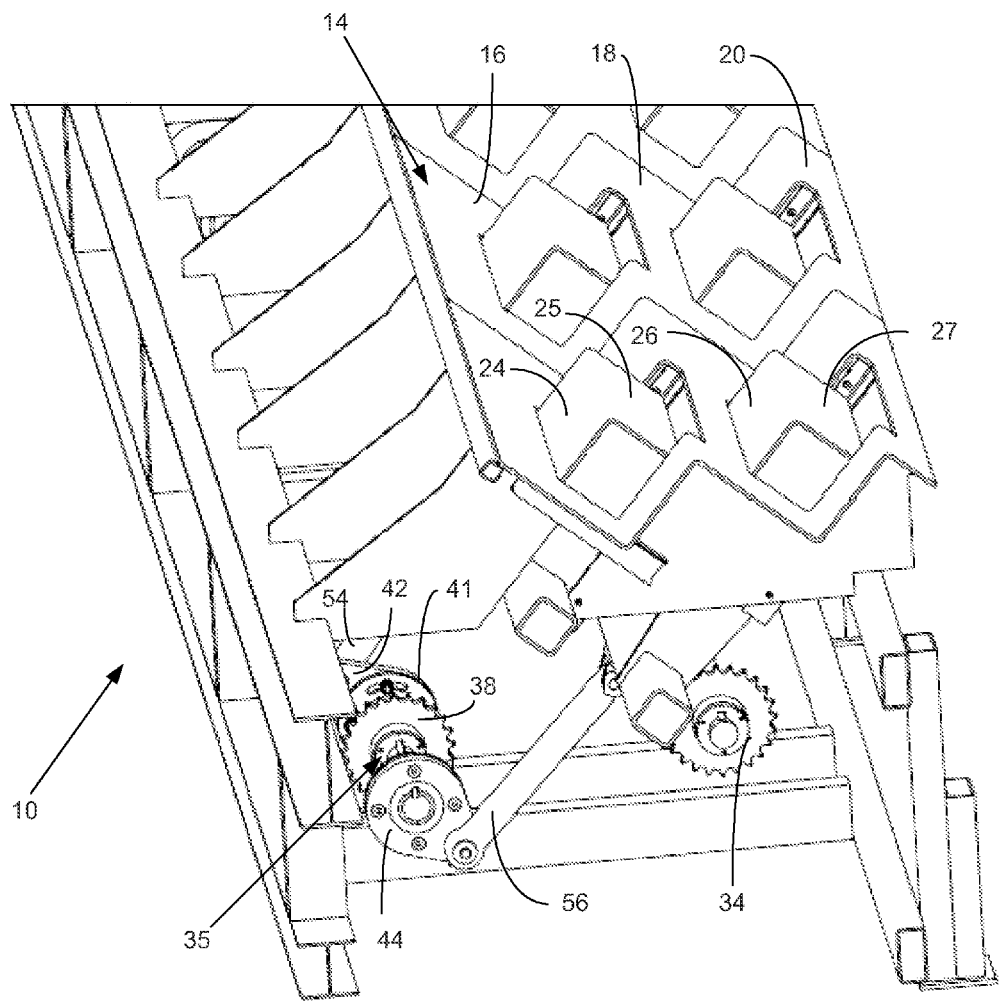
FIG. 2 is a fragmentary side perspective view of the variable phase step feeder of FIG. 1.
Figure 3:
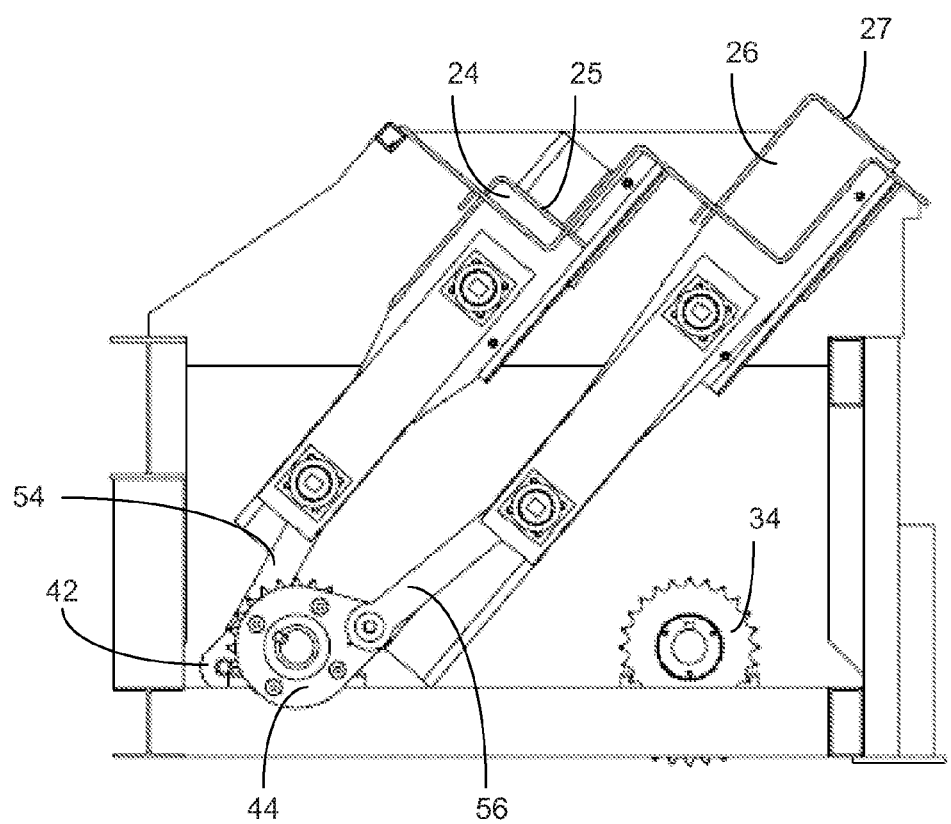
FIG. 3 is a side elevation view of the variable phase step feeder of FIG. 1.

FIGS. 1-3 illustrate several views of an example of a variable phase step feeder in accordance with various embodiments. Step feeder 10 includes a frame 12 with a set of fixed stairs 14. Fixed stairs 14 include a first fixed step level 16, a second fixed step level 18, and a third fixed step level 20. Step feeder 10 further includes a set of moving stairs 22 including a first moving step level 24 and a second moving step level 26. A top surface 25 of first moving step level 24 may be driven on a linear reciprocal path from a plane at or below the plane of the first fixed step level 16 to a plane at or above the plane of the second fixed step level 18. Similarly, a top surface 27 of second moving step level 26 may be driven on a linear reciprocal path from a plane at or below the plane of the second fixed step level 18 to a plane at or above the plane of the third fixed step level 20. First moving step level 24 and second moving step level 26 may each include multiple step segments. For example, in the embodiment shown in FIGS. 1-3, each step level includes five step segments, identified at 24a-24e and 26a-26e. In other embodiments, each step level may include any number of step segments, i.e., one or more step segments.

Figure 4:
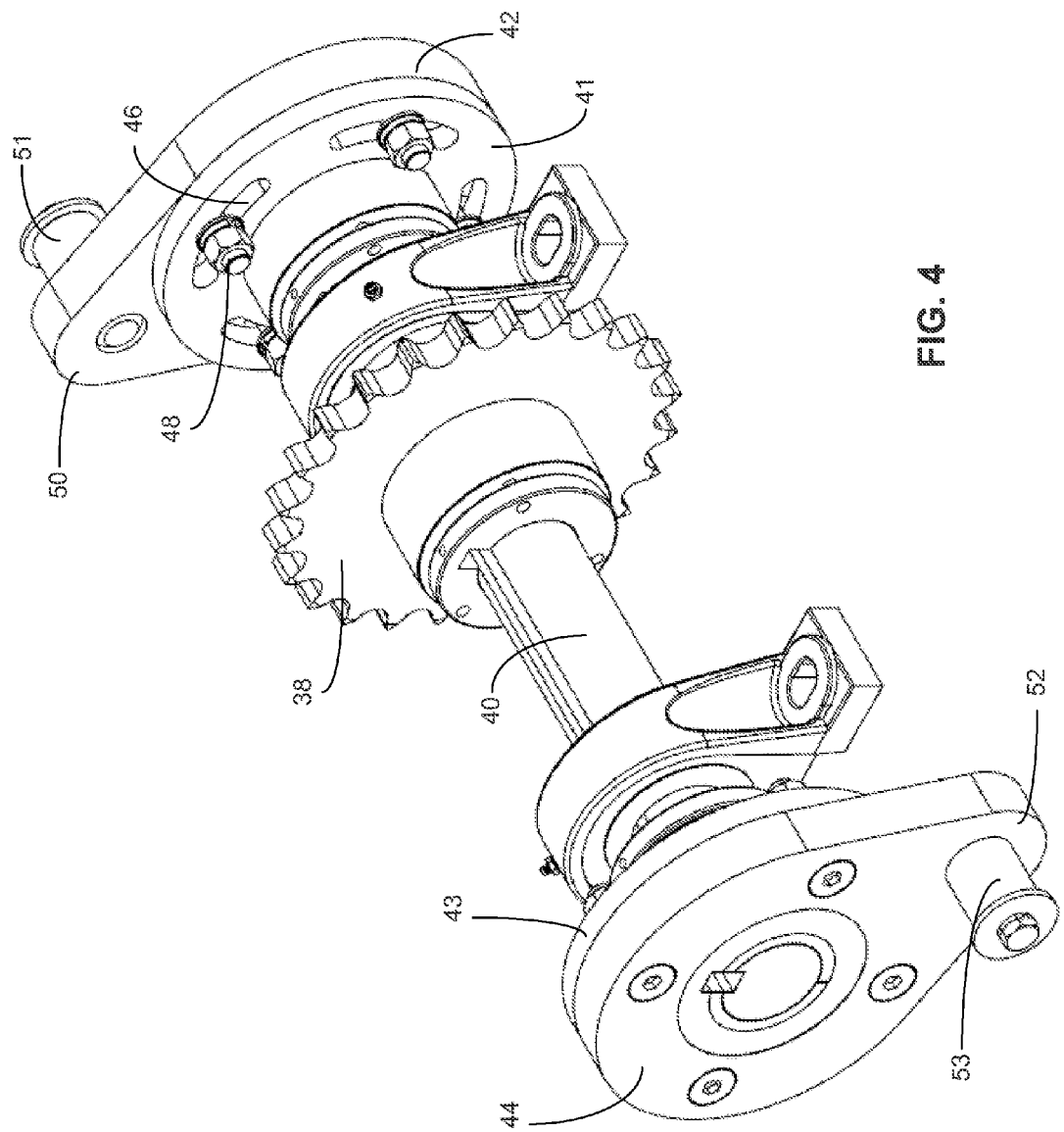
FIG. 4 is a perspective view of a crankshaft assembly in accordance with various embodiments.

The moving stairs 22 are driven by a motor and two crankshaft assemblies 35 and 37. A drive motor 30 rotates drive shaft 32. A drive shaft 32 is coupled to a drive sprocket 34 which is coupled to a drive chain 36. Drive chain 36 is coupled to a crankshaft sprocket 38 on a crankshaft 40. As best seen in FIG. 4, crankshaft 40 includes a pair of members 41 and 43, also referred to as rings 41 and 43, having annular slots 46. A pair of cams 42 and 44 are coupled to opposite ends of crankshaft 40 by bolts 48 disposed through annular slots 46. Cams 42 and 44 each include a lobe 50 or 52, respectively, with crank arm mounts 51 or 53 to which crank arms 54 or 56 may be mounted. Crank arm 54 couples the crank shaft 40 to first moving step level 24, while crank arm 56 couples the crank shaft 40 to second moving step level 26. As drive motor 30 rotates drive shaft 32, the sprockets 34 and 38 and drive chain 36 cause crankshaft 40 to rotate. The rotation of crankshaft 40 causes cams 42 and 44 to rotate, driving crank arms 54 and 56, which causes the first moving step 24 and the second moving step 26 to travel along a linear reciprocating path.

In various embodiments, the phase of the first moving step 24 with respect to the second moving step 26 may be varied by adjusting bolts 48 in annular slots 46 of at least one of rings 41 and 43. A more detailed view of the crankshaft assembly is shown in FIG. 4. The crank arm mounts 51 and 53 of cams 42 and 44, respectively, are shown in FIG. 4 to be oriented 180 degrees from each other, which will cause the first moving step level 24 to have a phase difference of 180 degrees with respect to second moving step level 26. In other words, first moving step 24 will move forward along the linear path while second moving step 26 moves backward, and first moving step 24 will move backward while second moving step 26 moves forward. This arrangement will tend to distribute the horsepower throughout the cycle of the moving stairs 22. Because of the interlocking arrangement of the fixed stairs and the moving stairs, the weight of the workpiece may be transferred from the moving stairs to the fixed stairs at the point of the cycle when the moving step is moving downward and drops below the plane of the fixed step. Similarly, the force of gravity may require more horsepower while the step is moving generally upwards. As such, there is more horsepower needed during about half the cycle of each step than during the other half. By adjusting the phase of the first step relative to the second step, the first step may be pushing a workpiece upward while the second step is moving downward without supporting the weight of a workpiece, and the second step may be pushing a workpiece upward while the first step is moving downward without supporting the weight of a workpiece. This is how the horsepower may be distributed more evenly throughout the cycle of the stairs.

Figure 5A:
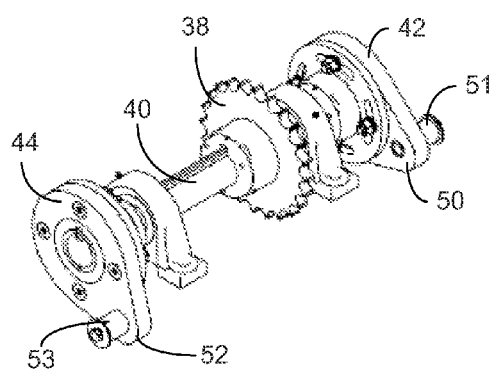
FIG. 5A is a perspective view of the crankshaft assembly of FIG. 4, with the crank arms in phase with each other.
Figure 5B:
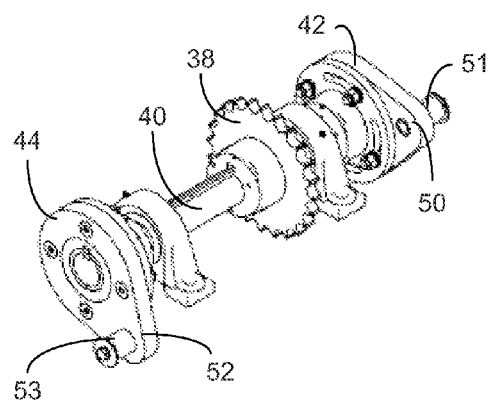
FIG. 5B is a perspective view of the crankshaft assembly of FIG. 4 with the crank arms 65 degrees out of phase with each other.
Figure 5C:
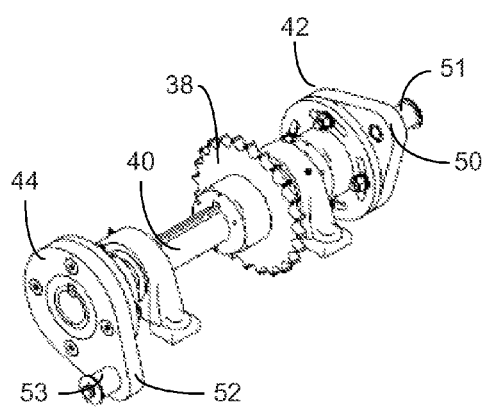
FIG. 5C is a perspective view of the crankshaft assembly of FIG. 4 with the crank arms 90 degrees out of phase with each other.
Figure 5D:
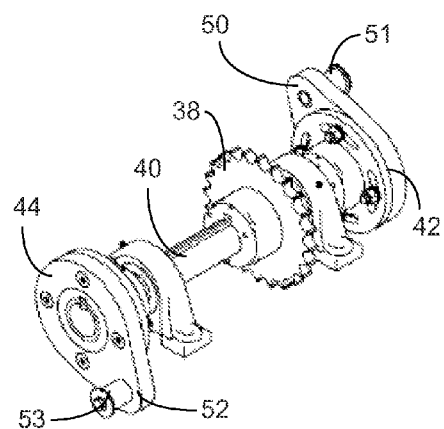
FIG. 5D is a perspective view of the crankshaft assembly of FIG. 4 with the crank arms 180 degrees out of phase with each other.

As best seen in FIGS. 5A-D, the crank arms 54 and 56 may be adjusted to move with different phases with respect to each other by moving cams 42 and/or 44 in annular slots 46. In FIG. 5A, the crank arms are shown in phase (i.e., zero degree phase difference), in FIG. 5B the crank arms are shown 65 degrees out of phase, in FIG. 5C the crank arms are shown 90 degrees out of phase, and in FIG. 5D the crank arms are shown 180 degrees out of phase. In the embodiments of the crankshaft assembly shown in FIGS. 4 and 5A-D, the design of the spaced annular slots may permit substantial variation of the phase angle, but may not permit every phase angle from 0 to 360 degrees. However, in other embodiments the phase angle may be infinitely adjustable. For example, the annular slots 46 may be of varying lengths and/or may be unequally spaced on rings 41 and 43 such that any phase between the crank arms is possible. In some embodiments, only one of rings 41 and 43 may include annular slots for adjusting the position of the cam. In other embodiments, both of the rings 41 and 43 may include annular slots for adjusting the position of the cams.

In some embodiments, the phase relationship of the first moving step relative to the second moving step may be adjusted manually, as described above for FIGS. 1-5D. In other embodiments, the variable phase step feeder may include a control mechanism for adjusting the phase of the steps. For example, the control mechanism may include a slider or a rotating dial for adjusting the phase relationship. The control mechanism may operate by any suitable control system, such as mechanically, electronically, and/or pneumatically. In some embodiments, the control mechanism may be mounted on the step feeder. In other embodiments, the control mechanism may operate remotely and include a remote controller. In such embodiments, the remote controller may be wired or wireless.

Figure 6:
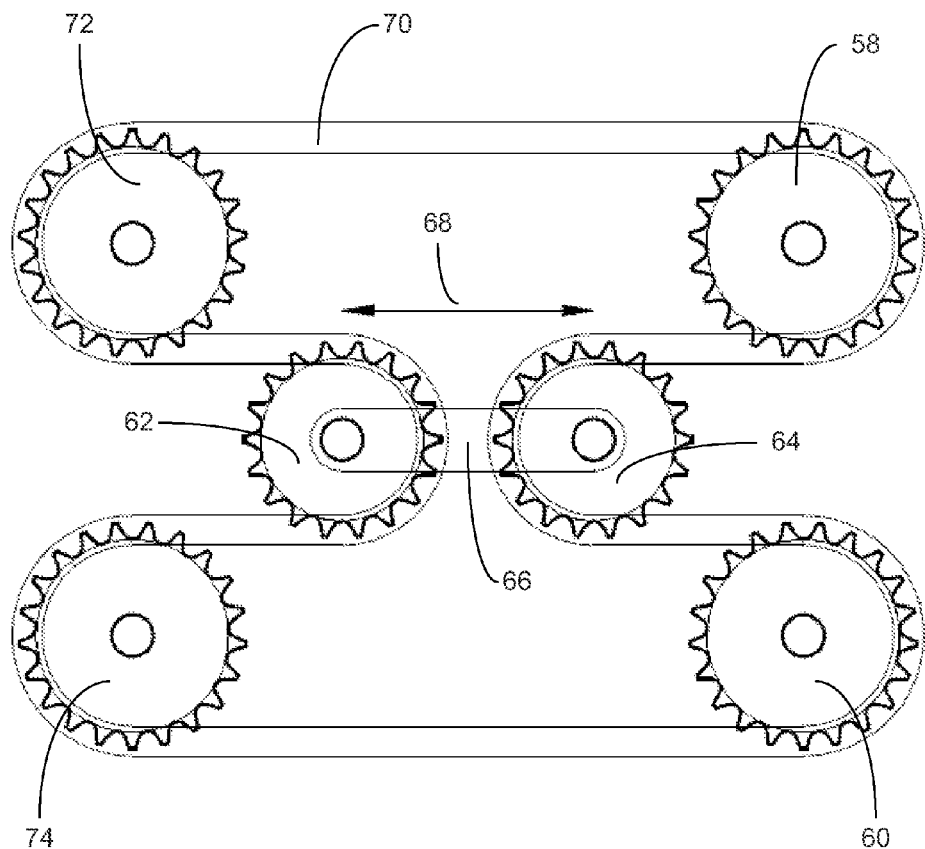
FIG. 6 is a schematic view of a phase variator in accordance with various embodiments.

In some embodiments, the control mechanism may include a phase variator to change the phase of the steps, an example of which is shown in FIG. 6. Sprocket 58 may be coupled to a first crankshaft assembly to drive the first moving step, while sprocket 60 may be coupled to a second crankshaft assembly to drive the second moving step. Sprockets 62 and 64 may be rigidly coupled together by a connector 66 and arranged so that they can move together along a path 68 parallel to connector 66, such that the movement of sprockets 62 and 64 increases or decreases the length of the chain 70 that is disposed between sprockets 58 and 60. The chain 70 may be further coupled to two more sprockets 72 and 74. Connector 66 may include a handle or other mechanism (not shown) for moving its position. As connector 66 moves sprockets 62 and 64 along path 68, the amount of chain 70 that is disposed between the sprockets 58 and 60 will increase or decrease, which will change the phase of sprocket 58 relative to sprocket 60. As such, the phase of the steps may be varied by adjusting the position of connector 66. In some embodiments, connector 66 may be controlled manually. In other embodiments, connector 66 may be controlled remotely, such as electronically and/or pneumatically, and may be controlled by a wired or wireless controller.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A step feeder, comprising:
    a fixed set of stairs including a first fixed step, a second fixed step, and a third fixed step;
    a moving set of stairs interposed between the fixed set of stairs, the moving set of stairs including a first moving step adapted to transport a workpiece from the first fixed step to the second fixed step, and a second moving step adapted to transport the workpiece from the second fixed step to the third fixed step, the first and second moving steps moving in a phase relationship with respect to each other; and
    a drive assembly adapted to drive the first moving step and the second moving step, the drive assembly including a crankshaft having one or more crank arms coupled thereto to drive at least one of the first and second moving steps;
    wherein the phase relationship of the first moving step relative to the second moving step is adjustable by adjusting the position of at least one of the one or more crank arms with respect to the crankshaft.

2. The step feeder of claim 1 wherein the one or more crank arms include a first crank arm coupled to the crankshaft to drive the first moving step, and a second crank arm coupled to the crankshaft to drive the second moving step, wherein the phase relationship of the first moving step relative to the second moving step is adjustable by adjusting the position of the first crank arm relative to the second crank arm on the crankshaft.

3. The step feeder of claim 2 wherein at least one of the first crank arm and the second crank arm is coupled to the crankshaft via at least one slot of a member.

4. The step feeder of claim 3 wherein the at least one of the first crank arm and the second crank arm is coupled to the crankshaft by at least one bolt adjustably extending through the at least one slot of the member.

5. The step feeder of claim 3 wherein the member comprises a ring having a plurality of annular slots.

6. The step feeder of claim 3 wherein the member has a plurality of slots that are unevenly spaced.

7. The step feeder of claim 3 wherein the member has a plurality of slots and at least one of the plurality of slots has a length that differs from a length of at least one other slot.

8. The step feeder of claim 2 wherein the first crank arm is coupled to the crankshaft via a plurality of slots of a first member, and the second crank arm is coupled to the crankshaft via a plurality of slots of a second member.

9. The step feeder of claim 1 wherein the phase relationship is adjustable manually.

10. The step feeder of claim 1 further comprising a control mechanism for adjusting the phase relationship of the first moving step relative to the second moving step.

11. The step feeder of claim 10 wherein the control mechanism operates at least one of mechanically, electronically, and pneumatically.

12. The step feeder of claim 10 wherein the control mechanism operates remotely.

13. The step feeder of claim 10 wherein the control mechanism includes a phase variator.

14. The step feeder of claim 1 wherein the drive assembly comprises a first motor adapted to drive the first moving step and a second motor adapted to drive the second moving step.

15. A step feeder, comprising:
    a fixed set of stairs including a first fixed step with a top surface defining a first step plane, a second fixed step with a top surface defining a second step plane, and a third fixed step with a top surface defining a third step plane;
    a moving set of stairs interposed between the fixed set of stairs and including a first moving step and a second moving step;
    a drive motor coupled to a crank assembly, the crank assembly including a crankshaft, a first crank arm coupling the crankshaft to the first moving step, and a second crank arm coupling the crankshaft to the second moving step, the crank assembly adapted to drive a top surface of the first moving step on a linear reciprocal path from a plane at or below the first step plane to a plane at or above the second step plane, and to drive a top surface of the second moving step on a linear reciprocal path from a plane at or below the second step plane to a plane at or above the third step plane;
    wherein a phase relationship of movement of the first moving step relative to the second moving step is adjustable by adjusting an orientation of the first crank arm relative to the second crank arm on the crankshaft.

16. The step feeder of claim 15 wherein at least one of the first crank arm and the second crank arm is coupled to the crankshaft by a member having a plurality of slots.

17. The step feeder of claim 16 wherein the member comprises a ring having a plurality of annular slots.

18. The step feeder of claim 15 wherein the first crank arm is coupled to the crankshaft by a first member having a plurality of slots and the second crank arm is coupled to the crankshaft by a second member having a plurality of slots.

19. The step feeder of claim 15 wherein the phase relationship is adjustable manually.

20. The step feeder of claim 15 further comprising a control mechanism for adjusting the phase relationship of the first moving step relative to the second moving step.

21. The step feeder of claim 20 wherein the control mechanism includes a phase variator.

22. The step feeder of claim 20 wherein the control mechanism operates remotely.

23. A method of transporting a workpiece from a receiving location to a delivery location, comprising:
   adjusting a phase of travel of a first moving step relative to a second moving step;
   receiving a workpiece at a first fixed step;
   transporting the workpiece from the first fixed step to a second fixed step by the first moving step; and
   transporting the workpiece from the second fixed step to a third fixed step by the second moving step;
   wherein one of the first moving step or the second moving step is driven by a first crank arm coupled to a crankshaft, and wherein the adjusting the phase of travel of the first moving step relative to the second moving step includes changing a position of the first crank arm with respect to the crankshaft.

24. The method of claim 23 wherein the first crank arm is coupled to the crankshaft via a member having a plurality of slots, and wherein the adjusting comprises changing the location of one or more bolts coupling the first crank arm to the crankshaft within the slots of the member.

25. The method of claim 23, wherein the first moving step is driven by the first crank arm, and wherein the second moving step is driven by a second crank arm coupled to the crankshaft.

* * * * *